United States Patent [19]

Tucker

[11] 4,294,470
[45] Oct. 13, 1981

[54] IN-LINE TUBE JUNCTIONS

[75] Inventor: Alfred D. Tucker, Kersbrook, Australia

[73] Assignee: Reed Irrigation Systems Pty Ltd., Australia

[21] Appl. No.: 101,275

[22] Filed: Dec. 7, 1979

[30] Foreign Application Priority Data

Dec. 11, 1978 [AU] Australia ............................... PD7073
Jun. 1, 1979 [AU] Australia ............................... PD9044

[51] Int. Cl.³ ........................................... F16L 41/00
[52] U.S. Cl. ........................................ 285/5; 285/61; 285/197; 285/200
[58] Field of Search ............... 285/197, 200, 97, 5, 285/61; 239/272

[56] References Cited

U.S. PATENT DOCUMENTS

| 3,806,031 | 4/1974 | Olson | 285/197 X |
| 3,915,384 | 10/1975 | Diggs | 239/272 |
| 4,059,291 | 11/1977 | Acda et al. | 285/197 |
| 4,121,771 | 10/1978 | Hendrickson | 239/272 |

FOREIGN PATENT DOCUMENTS

| 217819 | 3/1957 | Australia | 285/197 |
| 222515 | 7/1959 | Australia | 285/197 |
| 2600508 | 7/1977 | Fed. Rep. of Germany | 285/423 |
| 1486484 | 5/1967 | France | 285/197 |

Primary Examiner—Thomas F. Callaghan
Attorney, Agent, or Firm—Gordon L. Peterson

[57] ABSTRACT

An in-line junction member for tubes comprising an open-ended longitudinally slitted tubular socket member through which slit a portion of a flexible tube can be moved by flattening the tube either having a hollow spike with a sprinkler-engaging hollow takeoff, or alternatively a takeoff for a normal tube junction whereby a tube can be fitted into the hollow of the slitted tubular socket and engaged on a nipple and optionally with a keeper.

2 Claims, 5 Drawing Figures

IN-LINE TUBE JUNCTIONS

This invention relates to in-line tube junctions and it relates also to a sprinkler assembly embodying the junction.

BACKGROUND OF THE INVENTION

It is customary in irrigation systems to use a series of sprinklers arranged for instance adjacent to a row of trees and to couple these by means of a hose or a flexible tube, hereafter referred to as a tube, to a source of supply and to periodically energise the sprinklers by feeding liquid such as water, or water with fertilizer or other chemicals added thereto. Such an assembly requires in-line junctions.

In devices of this type it is necessary to position a sprinkler at each locality where watering is to occur and generally the method of supplying the water or other liquid to the sprinkler is somewhat intricate because of the large number of sprinklers that need to be connected, and the problem of fitting the feed tube to the sprinklers.

Such sprinklers may be positioned at spaced intervals along the main tube, or can be fed by laterals joined to the main tube, and it will be known that it is difficult to effectively join laterals to a main tube where the main tube is of considerable length and where it is not possible to thread the tube through or over the tube junction.

OBJECTS OF THE INVENTION

An object of the present invention is to provide a simple and effective method of connecting a tube to other tubes or to sprinklers and to provide interconnecting means between the main tube and the laterals and sprinklers, particularly where a large number of connections must be made at intervals to a long continuous length of tube. A further object is to achieve a simple construction which allows ready application of a hose to a series of in-line sprinklers or take-offs. A still further object is to a leakproof junction.

THE INVENTION

The device according to this invention comprises an open-ended longitudinally slitted tubular socket member through the slit of which the tube, either a main tube or a lateral, can be pushed by flattening the tube at the area which is to be accommodated in the socket member, the socket member having an inwardly projecting spike arranged to pierce the wall of the tube, or to engage in an aperture in the wall of the tube, whereby to place the hollow of the spike into communication with the hollow of the tube, the hollow of the spike in turn communicating with the hollow of a take-off which projects from the other side of the wall of the socket member, the take-off being shaped to engage either a lateral to be joined to the tube or a sprinkler.

BRIEF DESCRIPTION OF THE DRAWINGS

To enable the invention to be fully understood, it will be described with reference to the accompanying drawings in which.

DESCRIPTION OF THE PREFERRED EMBODIMENT

Figure 1:
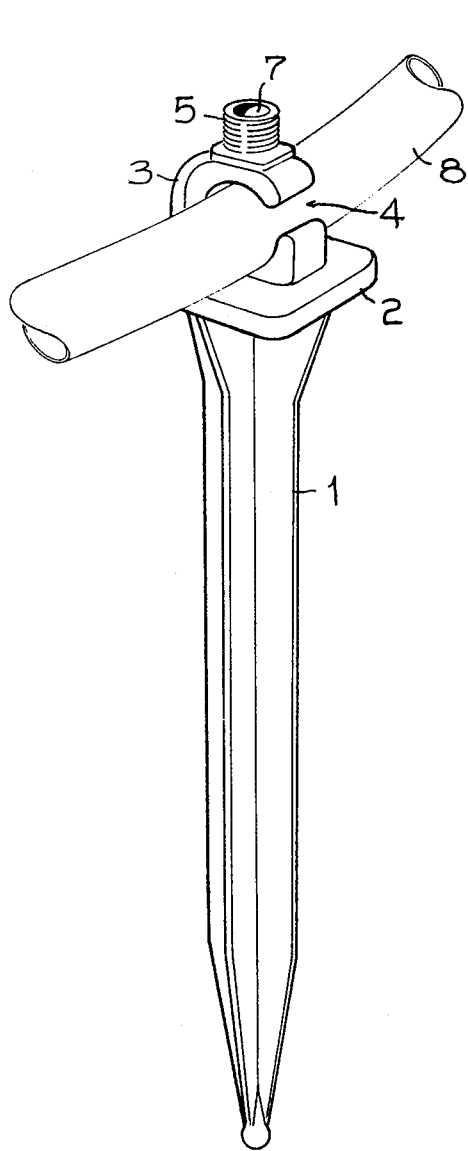
FIG. 1 is a perspective view of such a socket-forming member of a sprinkler support assembly
Figure 2:
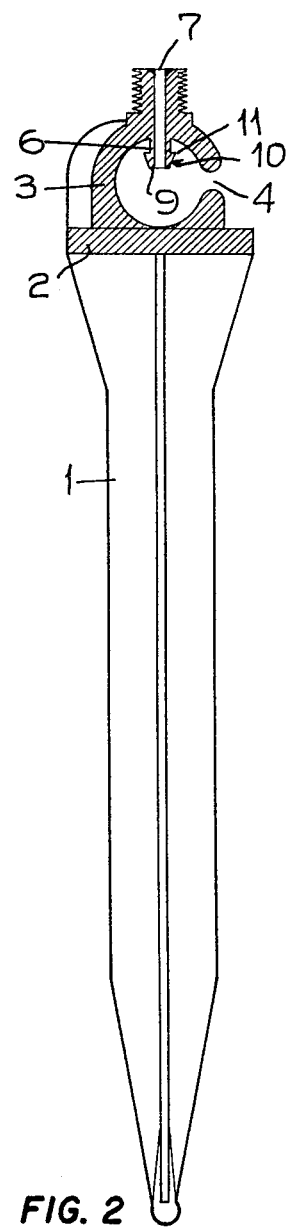
FIG. 2 is a part sectional side elevation of same

Referring first to FIGS. 1 and 2, a ground engaging member 1, which is of cruciform cross-section, has on it a head 2 which includes a slitted tubular socket member 3 of a dimension such that a flexible tube can extend through the socket member by compressing the tube and feeding it through the slit 4 which forms a discontinuity in the wall of the socket member 3 to position the tube within the socket member where the tube is allowed to expand, and this socket member 3 has on it a tubular take-off 5 which either forms a sprinkler or, as shown in the drawings, to which a sprinkler can be secured, and includes at the sprinkler holding locality a barbed spike 6 which projects inwardly in the discontinuous tubular socket member 3 and which is hollow and communicates with the hollow 7 of the take-off 5.

To place the sprinkler take-off 5 into communication with the water within the flexible tube 8, it is only necessary to force the wall of the tube onto the spike 6 so that the spike will puncture the tube, or the line is pre-punctured so that it can readily be forced over the spike to thus establish communication with the liquid supply in the tube. The puncturing of the tube can be automatically effected when water in the tube is pressurised sufficiently to expand the tube in the tubular socket member 3, which action, provided the spike has a sharp cutting edge at 9, will force the tube over the barbed spike 6 to pierce the tube. The aperture however should be smaller than the outer diameter of the spike to cause the wall of the tube adjacent the aperture to be drawn to lie along the spike below the barb.

As stated, the piercing of the tube can conveniently occur when pressure fluid is supplied to the tube to expand it within the discontinuous tubular socket member 3, and it will be realised while pressure is so applied the tube cannot leave the socket member 3 through the slit 4, through which it was positioned, and the tube is then firmly held in the socket on the ground-engaging member 1. The barb is indicated by 10 and it will be noted that this terminates in an annular shoulder 11, the reason for which will be appreciated from FIG. 5.

The sprinkler, which is not shown, can be of any usual or approved type but can conveniently be an elevated sprinkler mounted on a tube which screws to the aforesaid tubular take-off 5. Preferably where such a device is used adjacent to a tree the sprinkler is asymmetric and arranged to avoid wetting the tree trunk but this of course depends on the type of watering which is being undertaken and the species of plant life which is being dealt with.

By having a simple discontinuous tubular socket member to receive the tube it is a simple matter to position all of the ground-engaging members at the appropriate localities and to then force appropriate parts of a tube which extends along the full length of the sprinkler localities into the socket member through the slit 4 and to then expand the tube by application of liquid pressure to force the tube over the barbed spikes 6. In this way all of the sprinklers in the flow line can be simply placed into communication with the tube to be fed with fluid thereby.

Instead of simply using such a device for watering plants it can be used also for weed control and the like by feeding appropriate chemicals through the line with the water.

Figure 3:
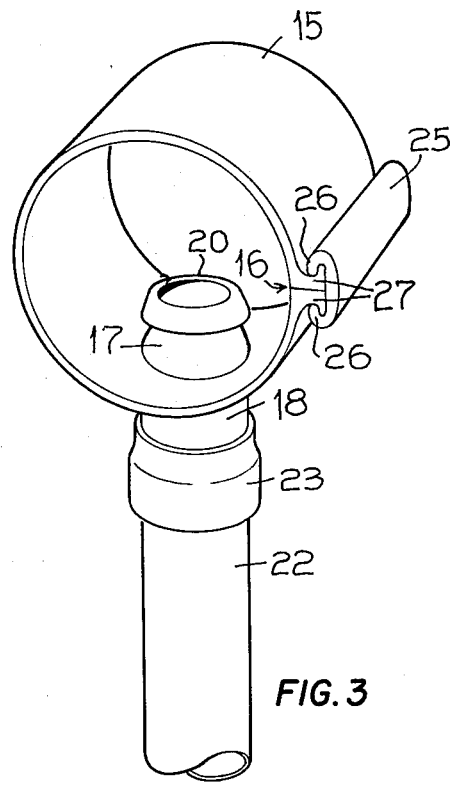
FIG. 3 is a perspective view of a socket member of modified form having a lateral joined thereto
Figure 4:
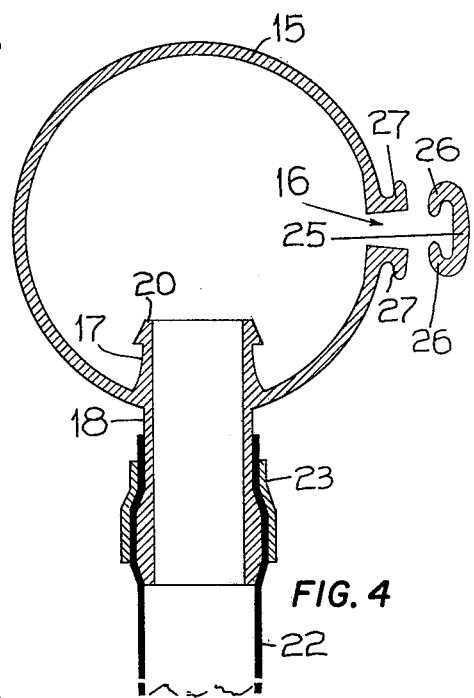
FIG. 4 is a transverse section of the assembly shown in FIG. 3 but with the keeper at the longitudinal slit of the socket removed.
Figure 5:
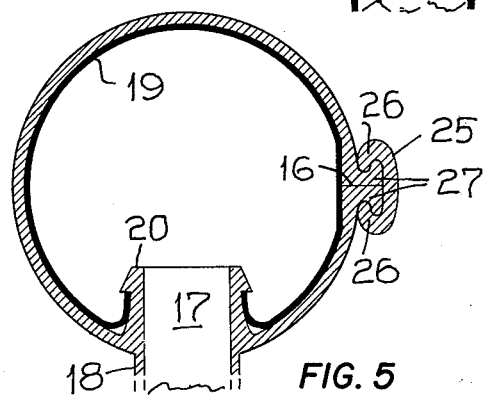
FIG. 5 is a similar view to FIG. 4 but with the keeper in place.

According to the forms shown in FIGS. 3, 4 and 5 the device according to this invention again comprises a socket member 15 which is of generally tubular form but has a longitudinal slit 16 so that an open-ended split socket member is formed into which a flexible plastic tube can be threaded by forcing the walls of the tube together to pass through the slit 16 in the socket member 15 to be housed within the socket. In this case the wall of the socket member 15 is sufficiently resilient to allow the slit 16 to be widened if necessary to insert the tube through the slit.

This socket 15 has a barbed spike 17 and a take-off 18 which are formed axially in line, both being hollow with the hollows communicating, the spike 17 being arranged to either pierce the tube where the tube has pressure liquid fed into it or having an aperture formed in it which is of a diameter less than the outer diameter of the spike so that when pressure is applied to the inside of the main tube, which now has a part of it housed in the socket member 15 and which tube is indicated by 19 in FIG. 5, is expanded to fill the socket member 15, the apertured wall of the tube is forced over the spike 17 to form a water tight seal therewith. The edge 20 of the nipple is sharp if the tube is to be pierced by pressure within it. The annular shoulder 21 serves to form a support for the end of the wall of the tube around the aperture formed therein.

The take-off 18 projects outwardly from the socket member 15 and is adapted to take a lateral 22 or any other tube which is preferably pushed over the spike 17 and is locked thereto by a shrink-fit band 23 or other pressure member to ensure that it will not be blown off from the take-off when pressure is applied.

Because these tubes generally require to carry substantial pressures, the socket member is of special form in that it is provided with a keeper 25 at the longitudinal slit 16 of the socket member 15 through which the main tube 19 passes, such joining means consisting of a "C" shaped strip having inturned ends 26 which engage out-turned hooked flanges 27 on the socket member 15 adjacent to the slit 16 and bridge the slit 16 after the tube has been inserted to prevent pressure from opening the socket member 15.

The keeper 25 can be so arranged that it closes the gap at the slit 16 of the socket member 15 to make the socket member 15 continuous around the tube so that when pressure is applied to the flexible tube 19 which passes through and has part housed in the socket member 15, the tube 19 will be supported around its circumference within the socket member 15.

As already stated and preferably in the case of larger high pressure tubes, the socket member 15 itself may be formed of a somewhat flexible material which allows the socket member to be opened out about the slit 16 to allow a tube to be more readily fitted to it and thus requiring less distortion of the tube to pass it through the slit 16 in the socket member 15. The tube must of course be inserted into the socket member before pressure is applied to the tube. The socket member 15, as said, has its slit 16 closed by means of the applied keeper 25, or at least has some other member applied thereto to prevent the socket member from opening out under pressure, so that by this means a socket member can be positioned at any required part of a main tube by preferably first aperturing the tube at the required locality and to then force part of the tube into the socket through the slit of the socket member, taking care that the aperture in the tube aligns with the inwardly projecting spike 17, then locking the socket against expansion by applying the keeper 25 after which the tube 19 can be expanded by applying liquid pressure to it internally to force it into tight contact with the inside of the socket member 15 and to force the apertured part of the tube over the spike 17. It will be found that when this apertured part of the tube is pushed over the spike 17, because the hole is smaller than the outer diameter of the nipple, the wall of the tube around the aperture is stretched inwardly over the spike so that when the pressure is applied, this part serves as a sealing washer to make a highly effective seal with the spike which increases with the pressure applied to the inside of the tube by the liquid carried by the tube. This is illustrated particularly in FIG. 5.

In this way for instance a series of laterals could each be supplied with a socket member of the form outlined and when it is desired to join these to a main line it is only necessary to position the laterals at the required locations and to distort the main tube into the socket member through the slit provided, distorting the socket member if necessary to fit the tube into it and to then lock the socket member 15 against expansion by means such as the keeper 25 and a highly effective seal results.

The claims defining this invention are as follows:
I claim:

1. An in-line tube junction for joining a first flexible tube to a lateral tube, said in-line tube junction comprising:

an open-ended, tubular socket member having a socket passage extending longitudinally therethrough, said socket member being formed of resilient material and having a longitudinal slit, the width of the slit being sized so that the first flexible tube when flattened can be inserted into the socket passage of the tubular socket member through the slit at least when the slit is increased in width by flexing the tubular socket member;

a hollow spike joined to the tubular socket member and projecting inwardly thereof, said spike being arranged to pierce the first flexible tube or to engage in an aperture in the first flexible tube to thereby place the hollow of the spike into communication with the interior of the first flexible tube;

a hollow take-off projecting outwardly from the tubular socket member adjacent said spike, the hollow of said take-off communicating with the hollow of the spike;

means for coupling the lateral tube to the take-off whereby fluid can flow from the first tube to the lateral tube through the spike and the take-off;

a removable keeper; and means on the socket member adjacent said slit for cooperating with said removable keeper to prevent removal of the first tube from the socket member through the slit.

2. An in-line tube junction member according to claim 1 wherein the said hollow spike is barb-shaped to form an annular outwardly extending shoulder intermediate the end of the said spike and the inner surface of the wall of the said socket whereby to engage that edge of the wall of the said first tube formed around the aperture in the first tube as the tube is forced over the said spike.

* * * * *